United States Patent [19]

Naumann et al.

[11] Patent Number: 4,654,065
[45] Date of Patent: Mar. 31, 1987

[54] QUASI-CONTAINERLESS GLASS FORMATION METHOD AND APPARATUS

[75] Inventors: Robert J. Naumann; Edwin C. Ethridge, both of Huntsville, Ala.

[73] Assignee: The United States of America as represented by the Administrator of the National Aeronautics and Space Administration, Washington, D.C.

[21] Appl. No.: 805,012

[22] Filed: Dec. 5, 1985

[51] Int. Cl.⁴ .......................................... C03B 37/025
[52] U.S. Cl. ............................................. 65/2; 65/13; 65/134; 65/136
[58] Field of Search ..................... 65/1, 2, 13, 134, 136

[56] References Cited

U.S. PATENT DOCUMENTS 3,485,613 12/1969 Herczog et al. ................. 65/134 X
4,565,557 1/1986 Naumann et al. ...................... 65/1

Primary Examiner—Robert Lindsay
Attorney, Agent, or Firm—Joseph H. Beumer; John R. Manning; Leon D. Wofford, Jr.

[57] ABSTRACT

Apparatus and method for forming ultrapure glass rods (13) or fibers (28) from a polycrystalline rod (11) in which the method comprises the steps of heating a selected short section of the rod in the first furnace (21) to form a molten zone of the rod, heating a second selected short section of the rod in a second furnace (19) which initially is separated from the first furnace by a very short gap to form a second molten zone of the rod which initially is contiguous with and part of the first molten zone of the rod to form a single molten zone 14, and then gradually moving the first and second furnaces apart to first form a rod (13) and then, ultimately, a fiber (28), of ultrapure glass in the increasingly widening gap forming therebetween.

17 Claims, 8 Drawing Figures

QUASI-CONTAINERLESS GLASS FORMATION METHOD AND APPARATUS

ORIGIN OF THE INVENTION

The invention described herein was made by employees of the U.S. Government and may be manufactured and used by or for the Government of the United States of America for governmental purposes without the payment of any royalties thereon or therefor.

CROSS REFERENCE TO RELATED APPLICATION

This application is related to U.S. patent application Ser. No. 601,130, filed Apr. 19, 1984, now U.S. Pat. No. 4,565,557, granted Jan. 21, 1986 which was a continuation-in-part of U.S. patent application Ser. No. 526,754, filed Aug. 26, 1983, now abandoned.

TECHNICAL FIELD

This invention relates generally to the ceramic arts and more particularly to a method and apparatus for quasi-containerless glass formation.

BACKGROUND OF THE INVENTION

This invention relates specifically to the formation of ultrapure glass by containerless processing and more specifically to the formation of ultrapure glass rods or glass fibers, including glass containing corrosive substance such as oxides, flourides, or tellurides, by containerless processes.

Also, the elimination of container-induced nucleation would allow deeper undercoolings and much slower critical cooling rates which can extend the range of glass formation to compositions that do not normally form glasses. Consequently, glasses with larger cross-sectional dimensions are possible. Some of these exotic glasses may have unique optical and electroptical properties.

This invention also relates to the production of exotic new glasses from reluctant glass forming compositions containing for example large concentrations of transition earth oxides, alkali earth oxides, or rare earth oxides with unique potential optical properties by containerless processing and more particularly to techniques which minimize heterogeneous surface nucleation thereby allowing slower cooling rates to form glasses than by existing techniques.

The use of optical fibers in information and communication systems is becoming increasingly utilized due to their high quality performance and large capacity transmission properties over long distances. The performance of the optical fibers depends on the purity by which they can be made and is directly proportional to the amount of losses which occur in the transmission of information through the fibers. Low losses and long lengths are very much desired. Silica glass fibers have been made using chemical vapor deposition techniques in a semi-containerless environment.

However, containerless or near containerless processing has the promise of being able to eliminate crucible contaminants from glass melts which would permit the production of ultrapure glasses from other materials. This becomes very important when dealing with materials that are extremely corrosive in the melt or require extremely low impurity fiber optic systems.

For example, halide glass fibers have extremely low theoretical transmission losses, particularly at infrared wavelengths, that are of the order of 10 db/km, being far below that of silica glass fibers that have losses of the order of $2 \times 10$ db/km. While the silica glass fibers are of sufficiently low loss for a practical optical communication network, there are considerable advantages and cost savings to be obtained with glasses of substantially lower losses, such as the halide based glasses and other exotic glasses such as tellurium based glass fibers.

One prior art example of forming ultrapure glass, including glass formed of corrosive materials, such as halides or tellurides, is disclosed in co-pending U.S. Pat. No. 4,414,164, by the present inventors, and entitled "Containerless High Purity Pulling Process and Apparatus for Glass Fibers," and which is fully incorporated herein by reference.

In this prior art disclosure it has been shown that high-purity fibers can be prepared by levitating a specimen of glass-forming material in a furnace at a temperature sufficiently high to maintain the specimen as a melt and drawing a fiber of the material from the melt. The melt is maintained in a position such that contact with container walls in the furnace is avoided. Levitation can be provided by directing acoustic wave energy so as to produce a stable node in which the melt is supported. Fibers may be drawn from the melt by insertion of a starting strand of wire and then pulling the wire therefrom followed by a glass fiber. Cooling means are employed as necessary to enhance solidification of the fiber and enable effective pulling of the fiber from the melt. This prior art invention provides the primary advantage of minimizing physical contact of the melt with container walls and thus eliminating much of the crucible contaminants which would otherwise produce adverse optical absorption or scattering and limit the propagation of optical signals in the fiber. The prior art also provides the advantage of reducing the surface heterogeneous nucleation rate, minimizing the production of unwanted crystallization. By elimination of heterogeneous nucleation sites, melts can be deeply undercooled, and the range of glass formation can be greatly extended. This suggests the possibility of forming ultrapure glass fibers from a variety of new materials such as halide glasses which cannot be formed into optical fibers by other, more conventional processes. Moreover, very low loss fibers can be produced from more conventional glasses such as those using silica by use of this prior art invention.

However, it has been found that most of the prior art, including the art briefly described above, is limited in the spectrum of glass forming materials with which they can be used and also the variety and quantity of products producible by these known prior art methods.

In summary, most of the pertinent art disclosing methods for forming glasses by semi-containerless processing has been confined to small droplets that are levitated by aerodynamic or acoustic forces and are allowed to either solidify while in levitation, allowed to free fall in a drop tube, or are positioned by small non-contacting forces in an orbiting spacecraft. These techniques generally have not been particularly successful and are inherently limited to fairly small spherical or nearly spherical samples. The size of the glass droplet produced is limited by the nature of the levitation device and by the low conductivity of the melt which limits the cooling rate, and hence the ability to cool the sample sufficiently rapidly to form a glass.

The near spherical shape of containerlessly solidified samples is a result of surface tension forces which control the shape of a free melt. In most cases this is not an optimal shape for usable devices to be made from the sample.

Also, the aerodynamic or acoustic forces used to levitate or position the sample may induce dynamic nucleation and limit the amount of undercooling that can be attained. This ultimately will restrict the limits of glass formation.

A primary object of the present invention is to provide improved methods of forming glass rods and glass fibers using quasi-containerless apparatus.

Another object of the invention is to provide improved methods of forming ultrapure glass rods and glass fibers of materials other than silica such as, for example, halide or telleride based glasses.

A third object of the invention is to provide an improved method of forming extremely low loss glass such as the halide or telleride based glasses as rods for optical components such as laser rods, modulators, Faraday rotators, optical switches, optical filters, optical lenses, fiber optic preforms, and as fibers for use in optical waveguides.

Yet another object is to provide an improved method for forming ultrapure glasses from materials such as halides and tellerides that are easily contaminated because of their corrosiveness in the melted portion of the material which is being formed into a glass.

A fifth object of the invention is to provide a method for making ultrapure glasses in a micro-gravity environment from a wide spectrum of glasses including corrosive glasses such as halides or tellerides.

BRIEF SUMMARY OF THE INVENTION

In accordance with one preferred form of the invention there is provided a method of forming ultrapure glass rods or fibers from a rod of glass precursor material comprising the steps of heating a selected short section of the rod in the first furnace to form a molten zone of the rod, heating a second selected short section of the rod in a second furnace to form a second molten zone of the first molten zone of the rod, and then gradually moving the first and second furnaces apart to first form an elongated molten float zone which is cooled in the midsection to a glass rod leaving two molten zones at the ends within the two traveling furnaces and then a fiber of ultrapure glass in the increasingly widening gap forming therebetween.

A primary feature of this invention is the novel methods of isolating the initial glass forming region from the feed material which can be polycrystalline, in one embodiment by the use of a double floating zone and in the second embodiment by the use of a gradient sample composition. These pseudocontainerless processes provide much better control of the melt without the possible disturbances and other difficulties inherent in most levitation techniques. Furthermore, the techniques lend themselves readily to the formation of rods or fibers which are useful configurations for many applications.

Another feature of the invention is the use of a trim heater in conjunction with a standard muffle furnace to provide better control of the zone width, which must be kept narrow to avoid hydrodynamic instabilities, and to reduce the temperature requirements for the heater.

Further features of the invention are their usefulness in the production of ultrapure glass rods such as laser rods, modulators, Faraday rotators, optical switches, optical filters, and extremely low-loss optical wavelengths from new exotic materials that do not readily form glasses by conventional processing, or materials that are easily contaminated because of their corrosiveness in the melt.

DETAILED DESCRIPTION OF THE INVENTION

Figure 1:
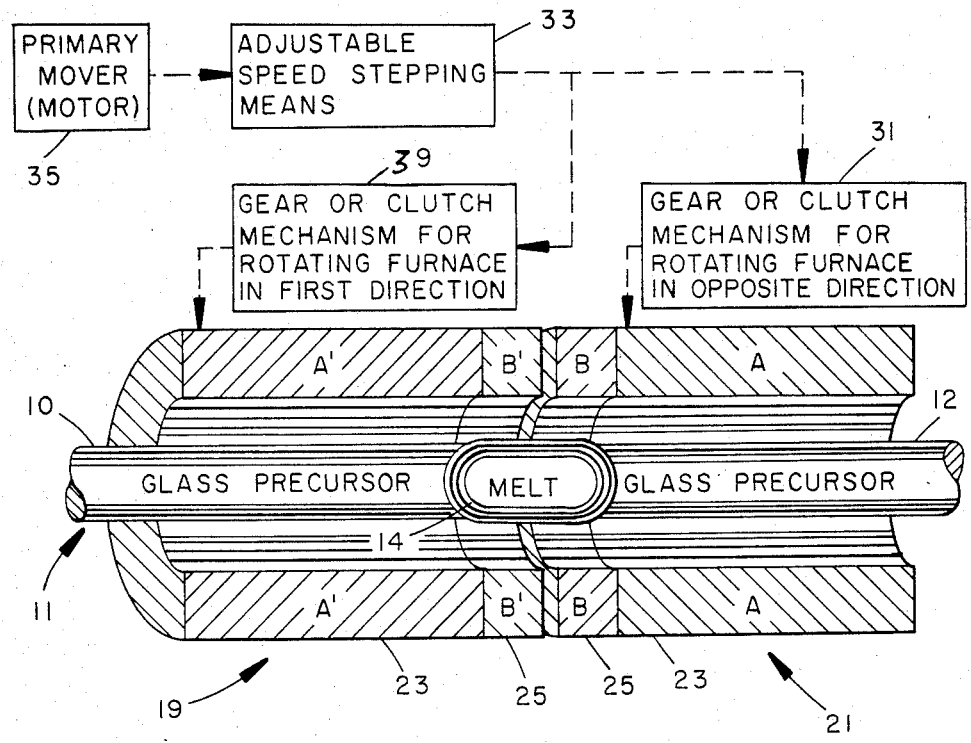
FIG. 1 is a broken-away isometric view of one form of the invention.

Referring now to FIGS. 1 through 5, which show the process of the first embodiment of the invention, FIG. 1 is a representation of the raw material (glass precursor rod 11) and the heating equipment (furnaces 19 and 21) required to form a rod or fiber of ultrapure glass.

More specifically, rod of glass precursor 11 of FIG. 1 can for example be either a rod of polycrystalline material, a metal organic derived gel precursor of the glass, or a vapor deposited preform of the material to be formed. The rod 11 is placed in the specially designed furnace arrangement illustrated in FIG. 1. The furnace arrangement consists of two main furnaces 19 and 21 each consisting of a pre-heating primary furnace 23 and a trim furnace 25. The two preheating furnaces 23 (also labeled A and A') can be identical in construction, as can be the two trim furnaces 25 (also separately labelled B and B'). A floating molten zone is formed by setting the hot walls of pre-heating furnaces A and A' to just below the melting temperature of the sample rod 11 and adjusting the two trim furnaces B and B' to melt completely through the sample rod 11, which, after the melt portion 14 has been formed are identified hereinafter as rod sections or simply rods 10 and 12. The melted portion 14 is held between the two heated but solid rods 10 and 12. The two furnaces 19 and 21 can be rotated relative to one another by means of gear or clutch mechanisms 39, 31 in order to aid homogenization of the melt 14 which forms under the trim heaters B and B'. The solid rods 10 and 12 may also be rotated relative to one another by means not shown to aid homogenization. In addition the two furnaces 19 and 21 can be traversed one or more times relative to the melted sample 14 by use of adjustable speed stepping means 33 powered by motor 35 to further aid in homogenizing the melt 14, to obtain additional purification, or to achieve uniform distribution of a dopant by zone leveling, as is done in standard float zone practice.

Figure 2:
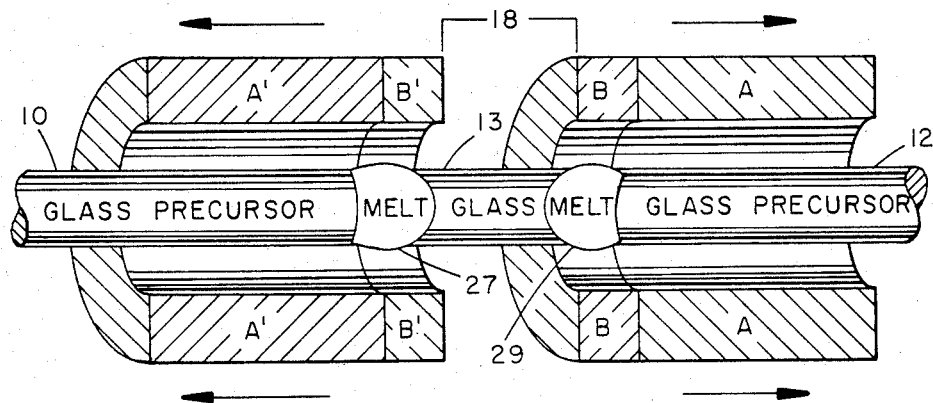
FIG. 2 shows a view similar to that of FIG. 1 but with the two furnaces separated a little farther apart to begin the formation of the ultrapure glass rod or, if desired, a fiber.

When the desired homogenity, purity, or dopant distribution has been reached and glass formation is to begin, the two furnaces 19 and 21 are slowly separated to a distance 18 as shown in the sequence of FIG. 1 and FIG. 2 by suitable means (not shown). This allows the region 13 between the two furnaces 19 and 21 to cool by radiation and eventually reach the glass transition temperature. Active cooling such as convective cooling may also be employed for extremely reluctant glass formers. Nucleation is avoided in this process by the elimination of container walls coming into contact with the molten material 14 (and 27 and 29 in FIGS. 2 and 3) and by the fact that the cooling glass forming region 13 is isolated from the glass precursor feed material 10 and 12, which may be crystalline, by liquid zones 27 and 29 of the same composition. Bubbles that may form in the melts 27 and 29 may migrate to the hottest portion of the melts 27 and 29 by thermocapillary driven flows (assuming, as is true in most cases, that increasing the temperature lowers surface tensions in the system). Thus, fining of the glass melt can be established.

The process requires a microgravity environment such as a space shuttle since the glass rod 13 to be formed must be supported, at least initially, by the surface tension of the two liquid zones 27 and 29.

Figure 3:
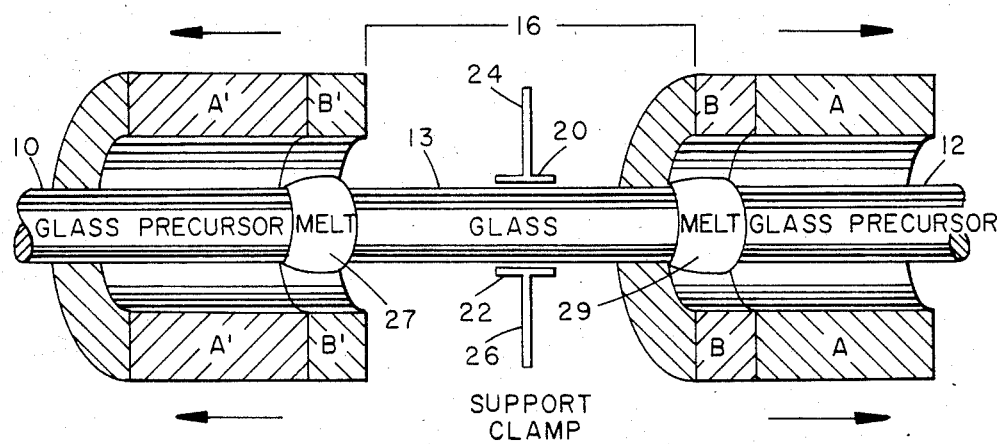
FIG. 3 shows another view similar to that of FIGS. 1 and 2 but with the two furnaces separated even farther apart to form a longer rod section of ultrapure glass and with external supports for the now longer rod section.

After a portion of the processed rod 13 has cooled below the glass transition temperature, as shown in FIG. 3, an external clamping system may be employed to help hold the rod in position, also as shown in FIG. 3. The clamping system may also provide some gas quenching to aid initial glass formation in region 13.

The clamping arrangement consists of a pair of clamps 20 and 22 as shown in FIG. 3, supported on the ends of support rods 24 and 26, respectively, which in turn are supportable by suitable means (not shown) which can, if desired, move horizontally as the rod grows in length to remain centered therein. Once the amorphous region between the two furnaces has formed, one of the furnaces can be removed or turned off and the process continued in the manner of a conventional float zone process.

Figure 4:
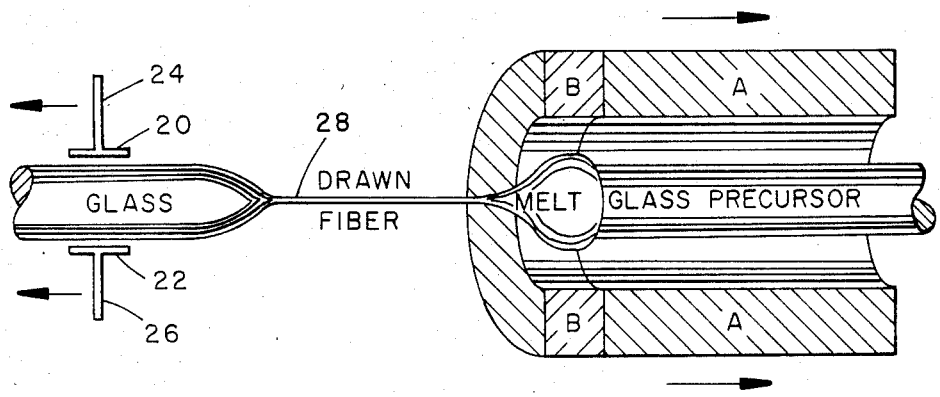
FIG. 4 shows yet another view of the structures of FIGS. 1, 2, and 3 but with one furnace removed and the rod now being drawn out to a degree whereby a fiber of ultrapure glass is being formed.
Figure 5:
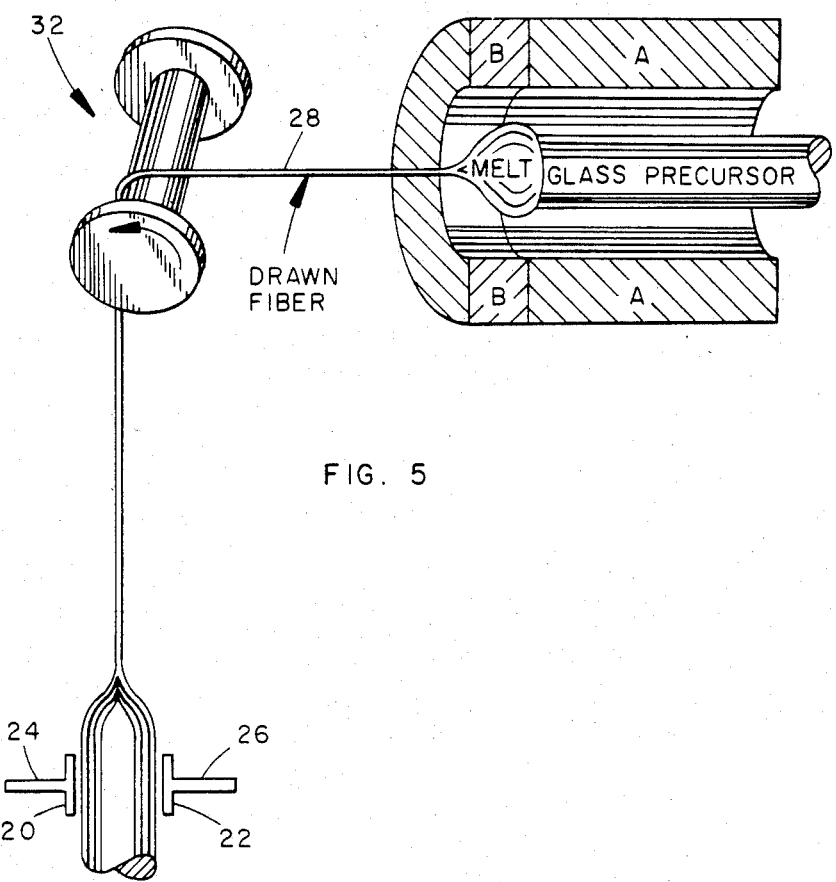
FIG. 5 shows still another view of the drawing process developed in FIGS. 1, 2, 3, and 4 but with the fiber of ultrapure glass being wound on a receiving reel to enable the accumulation of a long length of fiber of ultrapure glass which can be employed in a communication system, for example.

If a fiber is to be drawn, one of the furnaces can be removed and the glass rod is pulled by the external clamping system 24 and 26 which causes the melt to neck down, as shown in FIG. 4, to form a glass fiber 28 which can be clamped by means not shown and then drawn and accumulated by winding on a suitable spool or reel 32 (as shown in FIG. 5).

Figure 6:
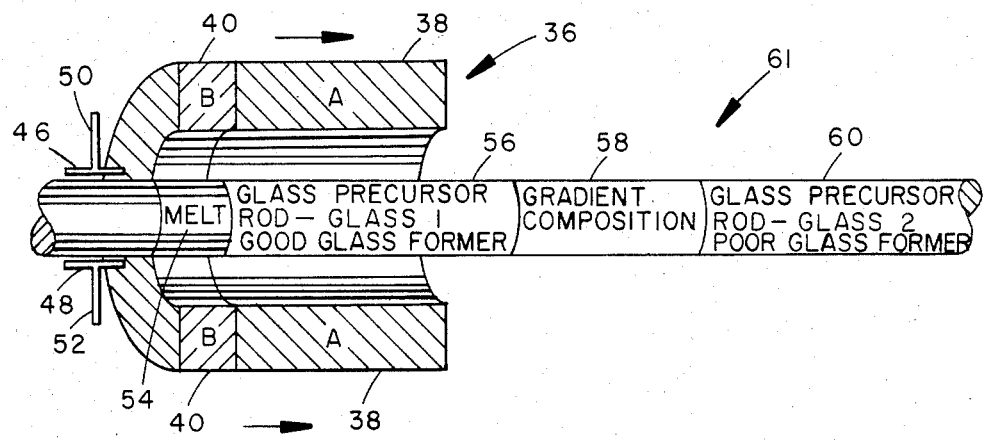
FIG. 6 shows a broken-away isometric view of a second embodiment of the invention in which only a single furnace is used and which is uniquely adapted to making rods of ultrapure glasses.
Figure 7:
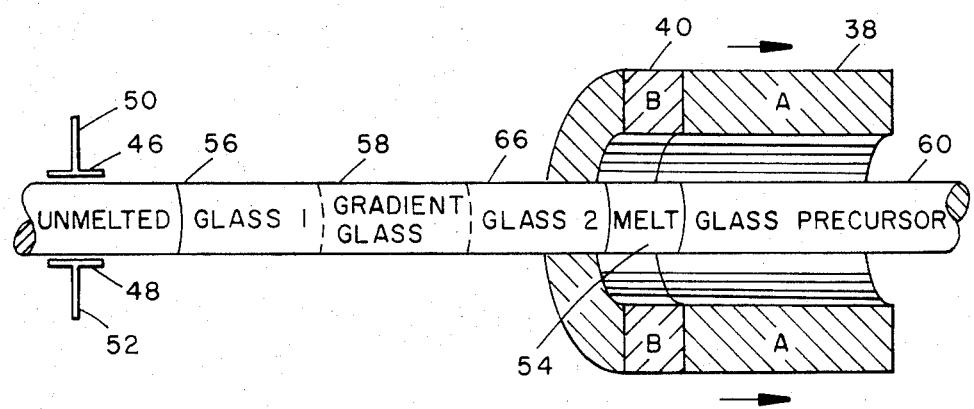
FIG. 7 is another view of the structure of FIG. 6 after the raw polycrystalline rod has been separated relative to the furnace to produce a rod of ultrapure glass.

Referring now to FIGS. 6 and 7 there is shown an alternate version of the invention which utilizes a single, moving furnace comprising a pre-heating primary furnace 38 (or A) and a trim furnace 40 (or B) as shown in FIG. 6 and a starting sample 61 with a compositional gradient section 58. The purpose of the sample compositional gradient portion 58 is to allow the system to first melt and solidify a good glass former 56, (glass 1), and then as the moving zone traverses the sample within the moving furnace, there is a gradual, progressive change of the composition to a more reluctant glass former 60, (glass 2) as shown in FIGS. 6 and 7. More specifically, the first portion of the sample to be melted by the moving float zone 54 will be the good glass forming composition 56 (glass 1). A clamping arrangement consisting of a pair of clamps 46, 48 and support rods 50, 52 is provided for holding the rod in the desired position. The furnace and the rod are moved relative to each other to traverse the molten zone along the sample rod. The molten zone sample cools and solidifies as a glass while the portion of the rod moving through trim furnace B continues to melt into a molten sample. As the composition gradient region 58 is traversed through the furnace 40, the molten zone 54 remains in contact with a solidified amorphous sample. This acts as a nonnucleating sting support for the more reluctant glass former 60 (glass 2) to be solidified as the molten zone 54 passes. Minimal mixing will occur in a low gravity float zone and the composition of the reluctant glass former 60 (glass 2) will be quickly established as soon as the gradient composition zone 58 is passed, as shown in FIG. 7.

Figure 8:
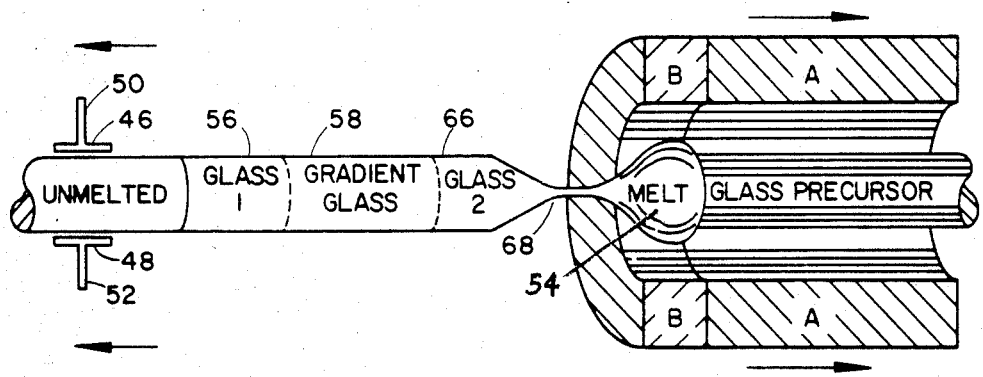
FIG. 8 shows a view of the structure of FIGS. 6 and 7 with the rod being drawn out to form a fiber.

As shown in FIG. 8, fiber may also be drawn in the alternate version of the invention. The rod is clamped at portion 56 by means of clamps 46, 48 and pulled away from the furnace, causing the melt 54 to neck down and form a fiber 68. The fiber in turn can be clamped, drawn and accumulated by winding on a suitable spool or reel (not shown).

In all forms of the invention, the finished glass rod is in the form of a circular cylinder. This is very advantageous for slicing lenses and filters. Minimal sample is lost during device fabrication. This is in marked contrast to completely containerlessly processed samples which are roughly spherical. Fibers are also in the form of a circular cylinder but with a much smaller cross-sectional area than obtainable with other known glass fiber forming techniques.

It is to be understood that the forms of the invention shown and described herein are but preferred embodiments thereof and that other forms of the invention may be apparent to those of ordinary skill in the art.

What is claimed is:

1. A method of forming a glass rod from a precursor rod comprising performing in a microgravity environment the steps of:
    heating a selected short section of said precursor rod in a first furnace to form a first self-supporting molten zone therein;
    heating a second selected short section of said precursor rod in a second furnace to form a second self-supporting molten zone of said rod which initially is contiguous with and part of said first molten zone;
    gradually moving said first and second furnaces apart to form an extended molten zone; and
    cooling the central portion of the extended molten zone at a sufficient cooling rate to a temperature below the glass transition temperature to form a rod of glass in the increasingly widening gap forming therebetween.

2. The method of claim 1 including the further steps of:
    clamping the glass formed between said molten sections;
    removing one of said furnaces from one end of said rod; and
    pulling the clamped glass section away from the remaining furnace so as to draw a fiber from the molten section therein.

3. The method of claim 2 including the further steps of gripping said fiber and winding the fiber on a reel.

4. A method as in claim 1 in which said first and second furnaces are rotated in reverse directions with respect to each other as they are gradually moved apart to aid homogenization of the melt as it forms.

5. A method as in claim 1 in which the two ends of the said glass precursor rod are rotated relative to each other to aid homogenization of the melt as it forms.

6. A method as in claim 1 in which said first and second furnaces are traversed back and forth with respect to each other as they are moved apart to aid in achieving uniform distribution of a dopant by zone leveling.

7. The method of claim 1 wherein each of said molten zones is formed by first heating said short section to a temperature near the melting point in a pre-heating primary furnace region and then melting the pre-heated section in a trim furnace region.

8. A method of preparing a glass rod from a reluctant glass—forming composition which comprises:
   preparing a precursor rod comprising a first axial section formed of a good glass former, a second axial section formed of a reluctant glass former and a third axial section between said first and second sections formed of a transitional composition gradually changing from a good glass former to a reluctant glass former;
   heating a short portion of said precursor rod at said first section in a furnace disposed in a microgravity environment to form a molten zone;
   moving said rod and said furnace relative to one another to gradually move said rod through said furnace and thereby move said molten zone through said second and third sections along said rod and cooling the area of said rod behind said molten zone to a desired undercooling temperature at a desired rate so as to produce glass from said reluctant glass-forming composition, said moving and cooling steps being performed in a microgravity environment.

9. The method of claim 8 including the further steps of:
   clamping the resulting glass rod at said first section and pulling said rod away from said furnace so as to draw a fiber from the molten section thereof.

10. The method of claim 9 including the additional steps of gripping said fiber and winding the fiber on a reel.

11. The method of claim 8 wherein said good-glass former is a silica-based composition and said reluctant glass former is halide or telluride based composition.

12. The method of claim 8 wherein said furnace includes a primary heating region and a trim heating region.

13. Apparatus for making a rod of glass from a glass precursor rod in a microgravity environment comprising:
   a first furnace for heating a first short section of said glass precursor rod to a first melted state zone;
   a second furnace for heating a second short section of said glass precursor rod adjacent to said first short section of rod to a second melted state zone which is contiguous to said first melted state; and
   means for gradually separating said first and second furnaces along with said first and second melted state zones to leave an increasingly longer molten zone adapted to be cooled to form a rod of glass in between said separating melted state zones.

14. Apparatus as in claim 13 and further comprising means for rotating said first and second furnaces in opposite directions to aid a more homogenous resulting rod.

15. Apparatus as in claim 13 and further comprising means for traversing said first and second furnaces back and forth over said rod to aid in homogenization of a dopant or other desired component or characteristic of said rod of glass being formed.

16. Apparatus as in claim 13 comprising further means to draw said rod of glass into a fiber.

17. Apparatus as in claim 16 and further comprising:
   means for removing one of said furnaces from one end of said fiber; and
   reel type means for winding said glass fiber onto said reel type and for continuing to draw fiber from the remaining melted zone.

* * * * *